US012034757B2

(12) United States Patent
    Nagatani

(10) Patent No.: US 12,034,757 B2
(45) Date of Patent: Jul. 9, 2024

(54) ANALYSIS SYSTEM, METHOD, AND PROGRAM

(71) Applicant: NEC Corporation, Tokyo (JP)

(72) Inventor: Noboru Nagatani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 321 days.

(21) Appl. No.: 17/440,302

(22) PCT Filed: Feb. 7, 2020

(86) PCT No.: PCT/JP2020/004816
    § 371 (c)(1),
    (2) Date: Sep. 17, 2021

(87) PCT Pub. No.: WO2020/195230
    PCT Pub. Date: Oct. 1, 2020

(65) Prior Publication Data
    US 2022/0159031 A1    May 19, 2022

(30) Foreign Application Priority Data

Mar. 28, 2019    (JP) .................................. 2019-063599

(51) Int. Cl.
    *H04L 9/40*    (2022.01)
(52) U.S. Cl.
    CPC ........ *H04L 63/1433* (2013.01); *H04L 63/205* (2013.01); *H04L 2463/142* (2013.01)
(58) Field of Classification Search
    CPC ............... H04L 63/1433; H04L 63/205; H04L 2463/142
    See application file for complete search history.

(56) References Cited

U.S. PATENT DOCUMENTS

| 8,881,288 B1 * | 11/2014 | Levy ..................... G06F 21/577 |
| | | 709/225 |
| 10,382,473 B1 * | 8/2019 | Ashkenazy ......... H04L 63/1466 |

(Continued)

FOREIGN PATENT DOCUMENTS

| JP | 2004-046742 A | 2/2004 |
| JP | 2005-341217 A | 12/2005 |

(Continued)

OTHER PUBLICATIONS

Japanese Office Action for JP Application No. 2021-508200 mailed on May 10, 2022 with English Translation.

(Continued)

*Primary Examiner* — Nelson S. Giddins
(74) *Attorney, Agent, or Firm* — Sughrue Mion, PLLC

(57) ABSTRACT

The topology identification unit 4 identifies a network topology of devices included in the system to be diagnosed. The detection unit 5 detects first attack routes that indicate flows of attacks that can be executed in the system to be diagnosed, based on security information about each device. The damage identification unit 8 identifies damage information that indicates content of damage of devices on the first attack routes when the devices are attacked. The detection unit 5 detects, based on the security information and the identified damage information, second attack routes that indicate flows of attacks that can be executed resulting from the content of damage.

20 Claims, 11 Drawing Sheets

(56) References Cited

U.S. PATENT DOCUMENTS

| | | | |
|---|---|---|---|
| 2005/0289649 | A1 | 12/2005 | Mitomo et al. |
| 2017/0244745 | A1* | 8/2017 | Key .................... H04L 63/1425 |
| 2017/0339183 | A1 | 11/2017 | Hu et al. |
| 2018/0337939 | A1* | 11/2018 | Agarwal ................. G06F 16/26 |

FOREIGN PATENT DOCUMENTS

| | | | |
|---|---|---|---|
| JP | 2010-152773 | A | 7/2010 |
| JP | 2013-197864 | A | 9/2013 |
| JP | 2014-130502 | A | 7/2014 |
| JP | 2017-068825 | A | 4/2017 |
| JP | 2017-224053 | A | 12/2017 |
| JP | 2019-050477 | A | 3/2019 |
| WO | 2016/076207 | A1 | 5/2016 |

OTHER PUBLICATIONS

International Search Report for PCT Application No. PCT/JP2020/004816, mailed on Apr. 14, 2020.
English translation of Written opinion for PCT Application No. PCT/JP2020/004816, mailed on Apr. 14, 2020.

* cited by examiner

FIG. 3

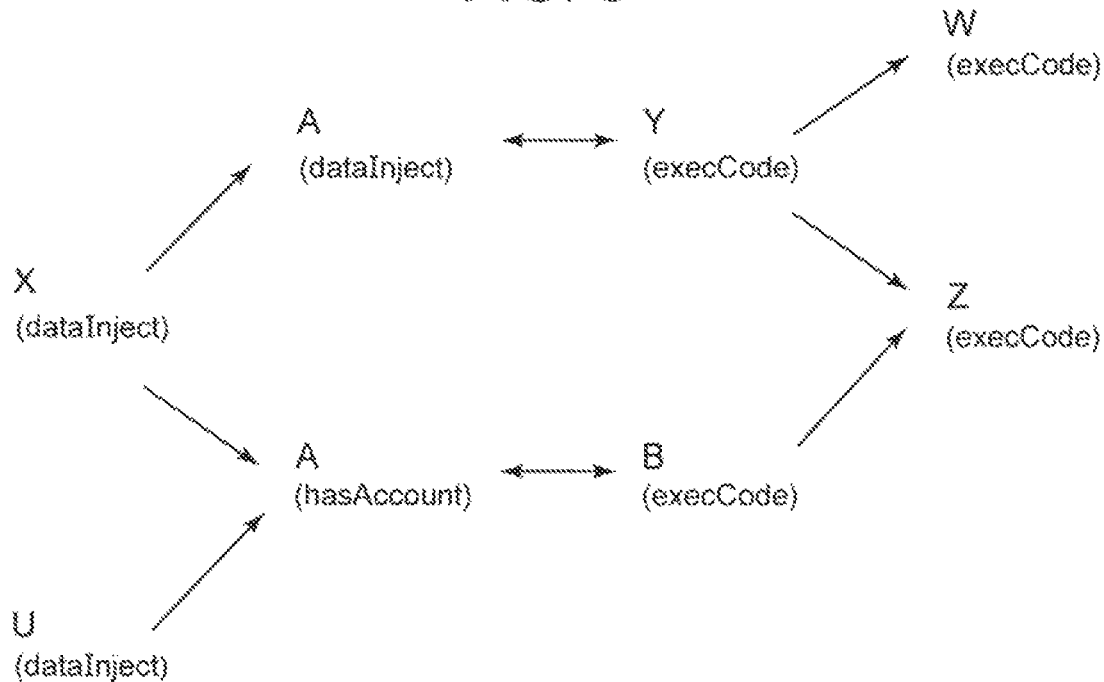

FIG. 4

RISK TABLE

| SOFTWARE NAME | VULNERABILITY |
|---|---|
| SOFTWARE A | CVE-2017-0*** |
| SOFTWARE B | CVE-2016-00** |
| SOFTWARE C | ABUSE OF FTP |
| SOFTWARE D | CVE-2015-**** |
| : | : |

FIG. 5

| FUNCTION OF DEVICE | ATTACK TYPE | DAMAGE INFORMATION |
|---|---|---|
| ACCOUNT SERVER FUNCTION | OBTAINING ADMINISTRATIVE PRIVILEGES | LEAKAGE OF ACCOUNT INFORMATION |
| HUMAN RESOURCES INFORMATION MANAGEMENT SERVER FUNCTION | TAMPERING DATA | LEAKAGE OF HUMAN RESOURCES INFORMATION |
| : | : | : |

FIG. 9
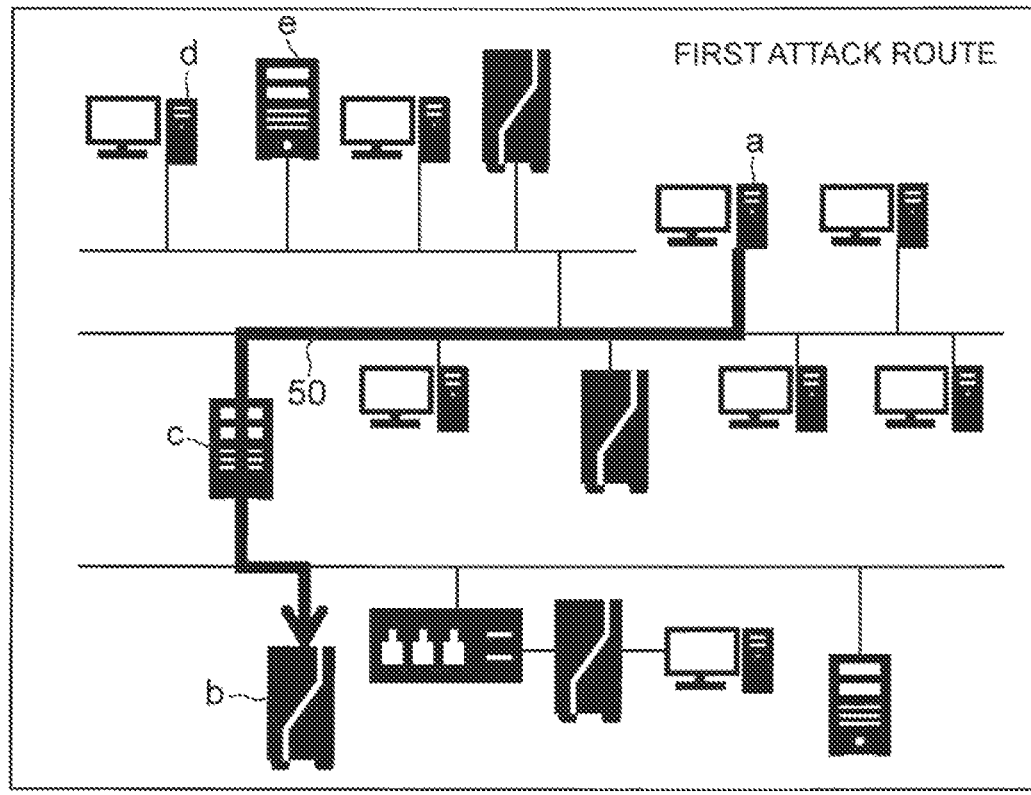
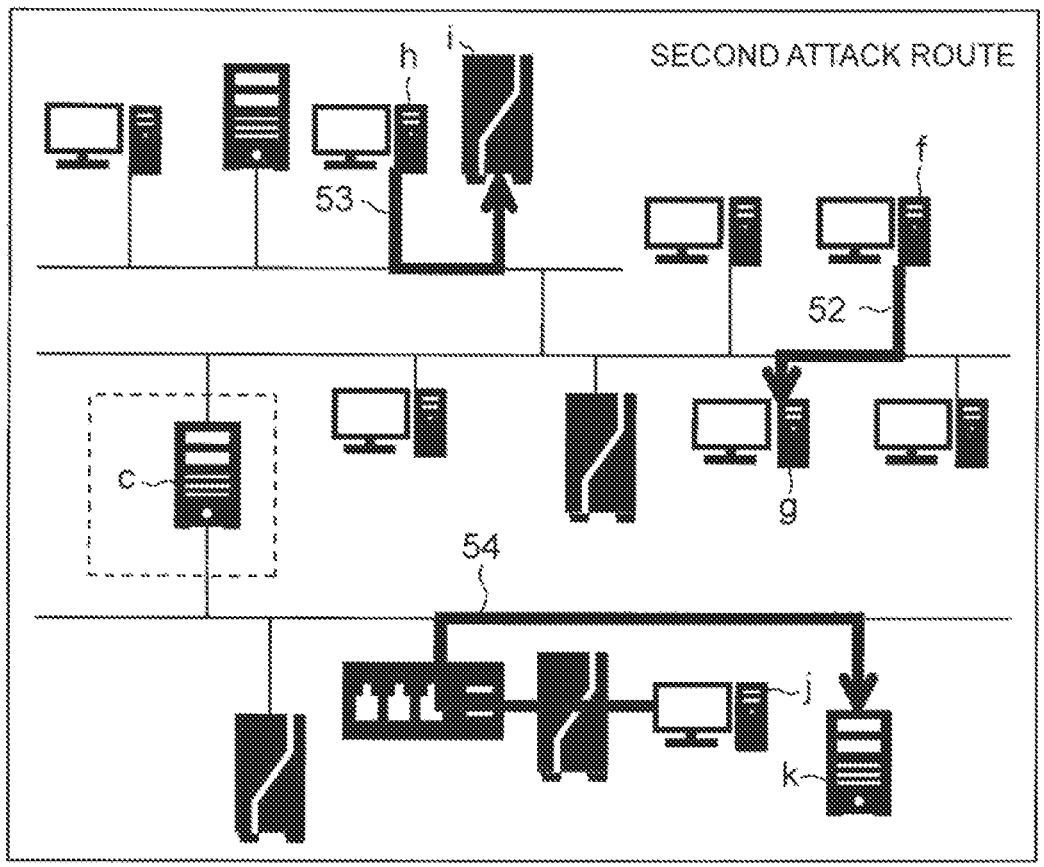

ANALYSIS SYSTEM, METHOD, AND PROGRAM

This application is a National Stage Entry of PCT/JP2020/004816 filed on Feb. 7, 2020, which claims priority from Japanese Patent Application 2019-063599 filed on Mar. 28, 2019, the contents of all of which are incorporated herein by reference, in their entirety.

TECHNICAL FIELD

The present invention relates to an analysis system, an analysis method, and an analysis program that display information that can be used as a basis for making decisions about how to deal with an attack on a system to be diagnosed.

BACKGROUND ART

It is required for, information processing systems that include the plurality of computers, to take security measures to protect information assets from cyber attacks. The security measures include assessing the vulnerability and the like of the target system and removing vulnerabilities as necessary.

Patent Literature (PLT) 1 describes a software development system that has a threat database. The software development system described in PLT 1 extracts the corresponding threat data from the threat database for each component of the control model, which is a control model generated from the design information of the development target and is an executable model that simulates the development target. By extracting the threat data, the software development system described in PLT 1 generates and outputs the data of the threat list which shows multiple threats to the control model.

In addition, PLT 2 describes an unauthorized access detection device that is capable of grasping the full scope of an attack that may occur before the attack is launched. The unauthorized access detection device described in PLT 2 is capable of understanding the full scope of a distributed denial-of-service attack that may occur.

In addition, PLT 3 describes a vulnerability analysis device that assists users to proactively take appropriate countermeasures by presenting vulnerabilities related to the user's system to the user in an intuitive and easy-to-understand manner.

In addition, PLT 4 describes a vulnerability risk assessment system that can evaluate the risk posed by vulnerabilities to information processing systems not only from a technical perspective but also from a business perspective.

CITATION LIST

Patent Literature

PLT 1: Japanese Patent Application Laid-Open No. 2017-68825

PLT 2: Japanese Patent Application Laid-Open No. 2005-341217

PLT 3: Japanese Patent Application Laid-Open No. 2014-130502

PLT 4: Japanese Patent Application Laid-Open No. 2017-224053

SUMMARY OF INVENTION

Technical Problem

The system that is the target of the security diagnosis is referred to as the system to be diagnosed. A flow of an attack that can be executed in the system to be diagnosed is called the attack route.

It is common to assess the impact of each vulnerability in order to take security-related measures.

However, since the configuration of each system to be diagnosed is different, it is difficult to grasp the impact of an attack on the system to be diagnosed only by assessing the impact of the vulnerability.

It is also desirable for security administrators to be able to easily understand the specific damage that may occur if a device on the attack route is attacked.

Therefore, it is an object of the present invention to provide an analysis system, an analysis method, and an analysis program that can analyze the damage that may occur when a device on an attack route is attacked.

Solution to Problem

An analysis system according to the present invention comprises a topology identification unit that identifies a network topology of devices included in the system to be diagnosed; a detection unit that detects first attack routes that indicate flows of attacks that can be executed in the system to be diagnosed, based on security information about each device; and, a damage identification unit that identifies damage information that indicates content of damage of devices on the first attack routes when the devices are attacked, wherein the detection unit detects, based on the security information and the identified damage information, second attack routes that indicate flows of attacks that can be executed resulting from the content of damage.

An analysis method according to the present invention is implemented by a computer, and comprises identifying a network topology of devices included in the system to be diagnosed; detecting first attack routes that indicate flows of attacks that can be executed in the system to be diagnosed, based on security information about each device; identifying damage information that indicates content of damage of devices on the first attack routes when the devices are attacked; and, detecting, based on the security information and the identified damage information, second attack routes that indicate flows of attacks that can be executed resulting from the content of damage.

An analysis program according to the present invention causes a computer to execute: a topology identification process of identifying a network topology of devices included in the system to be diagnosed; a first detection process of detecting first attack routes that indicate flows of attacks that can be executed in the system to be diagnosed, based on security information about each device; a damage identification process of identifying damage information that indicates content of damage of devices on the first attack routes when the devices are attacked; and, a second detection process of detecting, based on the security information and the identified damage information, second attack routes that indicate flows of attacks that can be executed resulting from the content of damage. The present invention may also be a computer-readable recording medium in which the analysis program described above is recorded.

Advantageous Effects of Invention

According to this invention, it is possible to analyze the damage that may occur when a device on an attack route is attacked.

BRIEF DESCRIPTION OF DRAWING

FIG. 3 It is a schematic diagram depicting an example of information showing the plurality of transition relationships of a "combination of device and attack state".

FIG. 4 It is a schematic diagram depicting an example of information stored in the risk information storage unit.

FIG. 5 It is a schematic diagram depicting an example of information stored in the damage information storage unit.

FIG. 9 It is a schematic diagram depicting a display example of the first and second attack routes in the first example embodiment.

DESCRIPTION OF EMBODIMENTS

Example embodiments of the present invention will be described below, with reference to the drawings.

Example Embodiment 1

Figure 1:
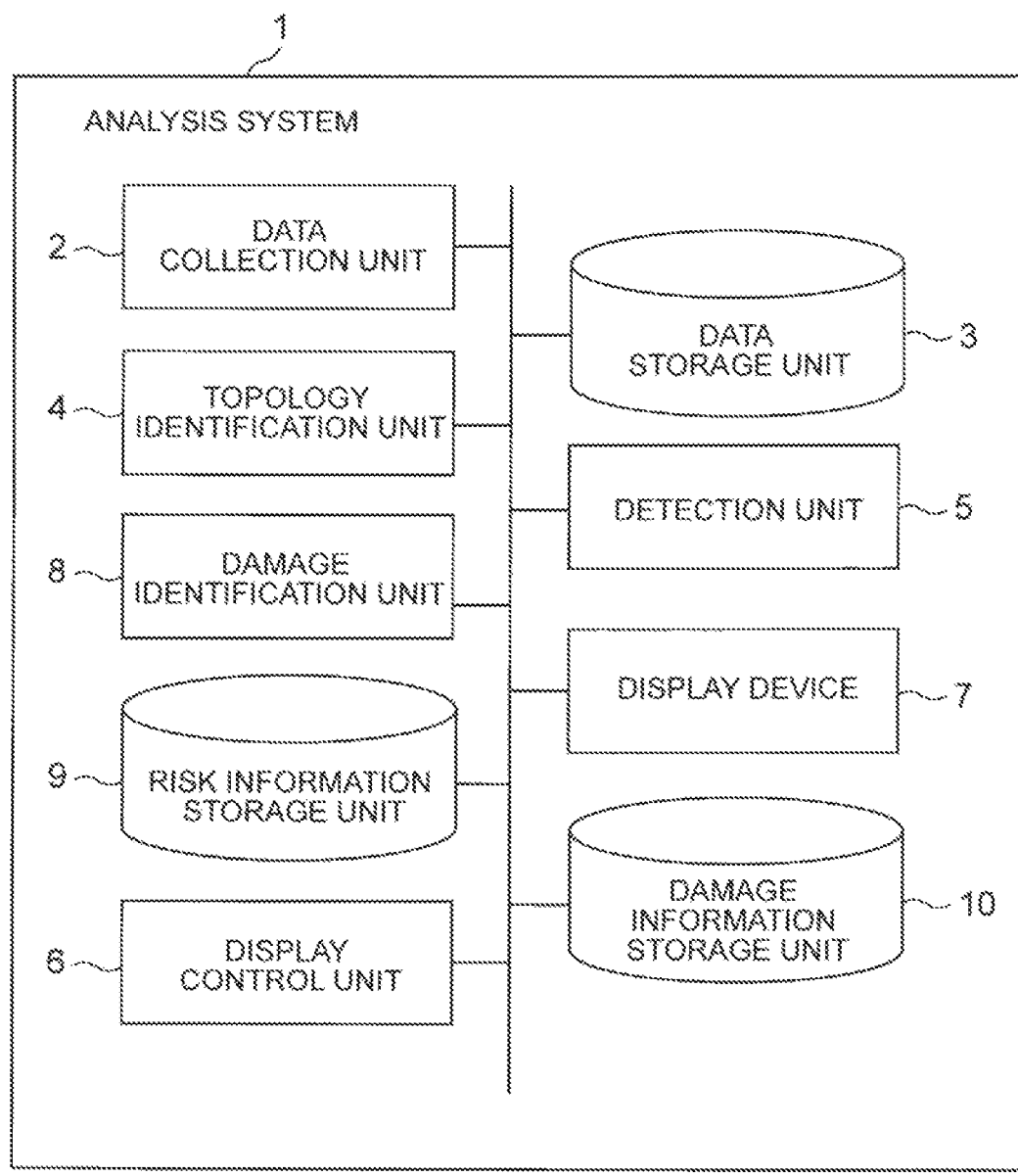
FIG. 1 It is a block diagram of an example of the analysis system of the first example embodiment of the present invention.

FIG. 1 is a block diagram of an example of the analysis system of the first example embodiment of the present invention. The analysis system 1 of the first example embodiment includes a data collection unit 2, a data storage unit 3, a topology identification unit 4, a detection unit 5, a display control unit 6, a display device 7, a damage identification unit 8, a risk information storage unit 9, and a damage information storage unit 10.

It is assumed that the analysis system virtualizes the system to be diagnosed and performs simulations based on the information of each device and other information to analyze the system to be diagnosed, as the analysis system 1 of the present example embodiment.

The data collection unit 2 collects information on each device included in the system to be diagnosed (the system that is the target of the security diagnosis).

Examples of systems to be diagnosed include, for example, IT (Information Technology) systems in companies and so-called OT (Operational Technology) systems for controlling factories and plants and the like. However, the systems to be diagnosed are not limited to these systems. A system in which the plurality of devices are connected via a communication network can be a system to be diagnosed.

Each device included in the system to be diagnosed is connected via a communication network. Examples of devices included in the system to be diagnosed include personal computers, servers, switches, routers, machine tools installed in factories, and control devices for machine tools. However, devices are not limited to the above examples. The devices may be physical devices or virtual devices.

Examples of information collected by the data collection unit 2 include, for example, information on the operating system (OS) installed in the device and its version, information on the hardware configuration installed in the device, information on the software installed in the device and its version, information on the communication data exchanged between the device and other devices and the communication protocol used to exchange the communication data, and information on the status of the ports of the device (which ports are open) and the like. The communication data includes information on the source and destination of the communication data. However, the examples of information collected by the data collection unit 2 are not limited to the above examples. The data collection unit 2 may collect other information as information about the device.

The data collection unit 2 may collect information about the devices directly from each device included in the system to be diagnosed. In this case, if the analysis system 1 is connected to each device via a communication network, the data collection unit 2 may collect information from each device via the communication network.

Alternatively, the data collection unit 2 may obtain information about each device from an information collection server that collects information about each device. In this case, if the analysis system 1 is connected to the information collection server via a communication network, the data collection unit 2 may collect information about each device from the information collection server via the communication network.

If each device is equipped with an agent, the data collection unit 2 may collect information about each device via the agent, or it may obtain information about each device from an information collection server that has collected information about each device via the agent.

An agent installed in each device may respectively transmit information about the device to an information collection server. In addition, the data collection unit 2 may collect information about each device included in the system to be diagnosed from the information collection server. In this case, for example, if the analysis system 1 is connected to the information collection server via a communication network, the data collection unit 2 may collect information about each device from that information collection server via the communication network.

When the data collection unit 2 collects information about each device included in the system to be diagnosed, it stores the information in the data storage unit 3.

The data storage unit 3 is a storage device that stores the information about each device collected by the data collection unit 2.

Figure 2:
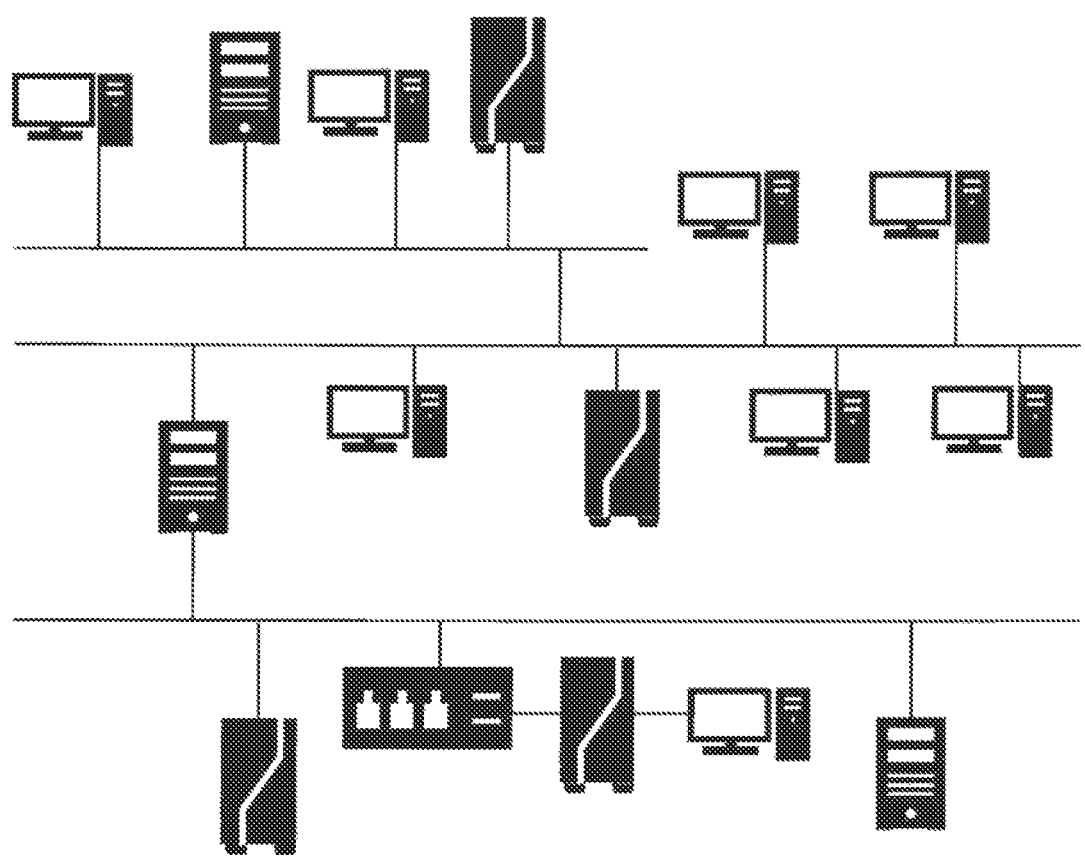
FIG. 2 It is a schematic diagram depicting an example of a network topology identified by the topology identification unit.

The topology identification unit 4 identifies the network topology of each device. Specifically, the topology identification unit 4 may identify the network topology of each device based on the network topology configuration given by the security administrator (hereinafter referred to simply as the administrator). In addition, the topology identification unit 4 may identify the network topology of each device based on the information about each device stored in the data storage unit 3. FIG. 2 is a schematic diagram depicting an example of a network topology identified by the topology identification unit 4. FIG. 2 indicates a situation in which the plurality of devices are connected via a communication network.

The detection unit 5 detects the attack routes in the system to be diagnosed based on the security information about each device stored in the data storage unit 3. Specifically, the security information about the devices includes the security support status of the devices. The attack route that is detected without using the damage information described below may be referred to as the first attack route.

As mentioned above, the attack route indicates the flow of an attack that can be executed in the system to be diagnosed. Specifically, the attack route is a route that indicates the order of the devices to be attacked, from the device that is the starting point of the attack to the device that is the end point of the attack.

The detection unit 5 may detect the attack route based on the security information about each device and the predefined analysis rules.

For example, the detection unit 5 may detect the attack route using the following method.

First of all, there are the plurality of types of attacks, and the attacks that a device may be subjected to vary depending on the vulnerabilities it has. Therefore, in example embodiment of the present invention, the state of a device that may be attacked due to vulnerability is defined as an attack state. For example, an attack state can be defined as "a state in which code can be executed (hereinafter referred to as "execCode")", "a state in which data can be tampered with (hereinafter referred to as "dataInject")", "a state in which files can be accessed (hereinafter referred to as "accessFile")", "a state in which account information is held (hereinafter referred to as "hasAccount")", "a state in which DoS (Denial of Service) attacks can be performed", etc.

The information that indicates the transition from one "combination of device and attack state" to another "combination of device and attack state" is called an attack scenario. The transition from one "combination of device and attack state" to another "combination of device and attack state" indicates that one attack becomes possible on one device, and another attack becomes possible on that device or another device. The detection unit 5 detects possible attack scenarios in the system to be diagnosed, based on the security information for each device and the predefined analysis rules. The detection unit 5 considers the "combination of devices and attack states" as a node in the plurality of detected attack scenarios, and obtains information indicating the plurality of transition relationships of the "combination of devices and attack states" by connecting the common node. FIG. 3 is a schematic diagram depicting an example of this information. In FIG. 3, "A", "B", "U", "W", "X", "Y", and "Z" represent devices, respectively. Here, the case, where the information shown in FIG. 3 is obtained, will be explained as an example.

The detection unit 5 accepts the designation of the analysis target from the administrator via the user interface (not shown). The analysis target may be a device that is the starting point of an attack, a device that is the end point of an attack, or a combination of the two. Also, the plurality of analysis targets may be designated. The detection unit 5 detects the attack route based on the information (see FIG. 3) that indicates the plurality of transition relationships of "combination of device and attack state" for the analysis target specified by the administrator.

For example, if the administrator designates a device X as the starting point of the attack and a device Z as the end point of the attack, the detection unit 5 can detect the attack route "X→A→Y→Z" (hereinafter referred to as attack route 1), and the attack route "X→A→B→Z" (hereinafter referred to as attack route 2) based on the information schematically shown in FIG. 3. In this way, even if one starting point and one ending point are designated, the plurality of attack routes may exist.

For example, if the administrator designates a device X as the starting point of the attack and a device W as the end point of the attack, the detection unit 5 can detect the attack route "X→A→Y→W" based on the information schematically shown in FIG. 3.

This method is an example of how the detection unit 5 detects attack routes.

In the above method, even if there are common devices on different attack routes, the attack states of the devices are not necessarily identical. Since a device may have the plurality of vulnerabilities, or a single vulnerability may result in the plurality of attacks, the attack state of the common devices on different attack routes may be different. For example, in the above attack route 1, the attack state of device A is "dataInject". In addition, in the above attack route 2, the attack state of device A is "hasAccount" (see FIG. 3).

In addition, the attack route is not always detected for the analysis target designated by the administrator. For example, if an administrator designates a device Z as the starting point of an attack and a device X as the end point of an attack, no attack route will be detected (see FIG. 3). This means that there is no attack from device Z to device X.

When the administrator designates only the starting point, the detection unit 5 may set the important device as the end point. When the administrator designates only the endpoint, the detection unit 5 may set a predetermined terminal that has a high possibility of being the starting point as the starting point.

The damage identification unit 8 identifies the damage information for each device on the attack route. The damage identification unit 8 performs this process for each attack route. However, there may be devices on the attack route for which no damage information is identified.

Hereinafter, the following is an example of how the damage identification unit 8 identifies damage information for each device of one attack route. The damage identification unit 8 identifies the vulnerability and the function of the device for each device of the attack route of interest.

As a method of identifying device vulnerability, the damage identification unit 8, for each device on the attack route of interest, checks each software installed on the device and determines each vulnerability corresponding to each software installed on the device by referring to the risk table (see FIG. 4) stored in the risk information storage unit 9. In addition, the damage identification unit 8 identifies the vulnerability according to the attack route from among the determined vulnerabilities, for each device on the attack route of interest.

The information stored in the risk information storage unit 9 is explained. FIG. 4 is a schematic diagram depicting an example of information stored in the risk information storage unit 9.

The relationship between various types of software and various types of security vulnerabilities is predetermined. The risk information storage unit 9 stores the information indicating the relationship between various software and various vulnerabilities in a table format, for example (see the table shown in FIG. 4). The table indicating the relationship between the software and the vulnerabilities is hereinafter referred to as the risk table. The administrator may store the risk table in the risk information storage unit 9 in advance.

Security vulnerabilities can be categorized into two major types. The first vulnerabilities are vulnerabilities caused by software or device (routers, etc.) defects. Information on these vulnerabilities is collected or classified by various organizations. The vulnerabilities are numbered accordingly. As an example, in the Common Vulnerabilities and Exposures (CVE), an identifier of the form "CVE-**-**" is assigned to the discovered vulnerability. The second vulnerabilities are vulnerabilities caused by the protocol specification. Examples of such vulnerabilities are "abuse of FTP (File Transfer Protocol)", "abuse of Telnet", etc. In example embodiment of the present invention, the vulnerabilities include these first and second vulnerabilities.

The damage identification unit 8, for example, identifies the function of each device as follows.

The conditions according to the function of the device are defined in advance. For example, for the "account server function," one, two, or more of the following conditions are predetermined: "software for the account server is installed", "the device exchanges communication data with other devices using a predetermined protocol", or "a predetermined port is open".

For example, for the "human resources information management server function", the condition that "software for the human resources information management server is installed" is predetermined.

The damage identification unit 8 may identify the function of the device by referring to the information about the device whose function is to be identified and determining whether the information satisfies the conditions corresponding to any function. If the information about the device does not meet the conditions for any of the functions, the damage identification unit 8 may derive the result "No applicable function" as the function of the device.

Using the method described above, the damage identification unit 8 identifies the function of each device on the attack route of interest.

However, the damage identification unit 8 may identify the functions of devices in other ways. For example, the damage identification unit 8 may identify the function of each device on the attack route by receiving the designation of the function of each device from the administrator via a user interface (not shown).

The damage identification unit 8 may also identify the function of a device based on the data flowing on the communication network. For example, by analyzing packets sent from an arbitrary device, the damage identification unit 8 can identify that the arbitrary device has the function to access the accounting system realized by cloud computing.

Based on the data flowing on the communication network, the damage identification unit 8 may infer the port that an arbitrary device is accessing and the authentication method (e.g., Kerberos authentication) that an arbitrary device is running.

Once the damage identification unit 8 has identified the vulnerability and function of one device on the attack route of interest, it searches the table stored by the damage information storage unit 10 (see FIG. 5) for records that match that function.

The damage information storage unit 10 is a storage device that stores damage information (information that indicates content of damage of devices when the devices are attacked) according to the function of the device. FIG. 5 is a schematic diagram depicting an example of information stored in the damage information storage unit 10.

The damage information storage unit 10 stores, for example, a table that maps device functions, attack types, and damage information, as shown in FIG. 5. The attack type is identified by identifying the function of the device.

If there is an applicable record, the damage identification unit 8 reads the damage information included in that record and identifies the read damage information as the damage information for that device. If there is no applicable record, the damage identification unit 8 determines that there is no damage information for the device. The damage identification unit 8 performs this operation for each device on the attack route of interest. As a result, the damage information for each device on the attack route of interest is determined.

The damage identification unit 8 performs the same operation as above for each attack route, and identifies damage information for each device on each attack route. However, as mentioned above, there may be devices for which no damage information is identified.

In the above description, we have shown a case where the damage identification unit 8 determines damage information based on the function of the device. The damage identification unit 8 may also identify damage information based on the function of the device and the vulnerability of the device, or based on the attack type, etc. Furthermore, the damage identification unit 8 may identify damage information based on a pair of the function of the device and attack states.

Figure 6:
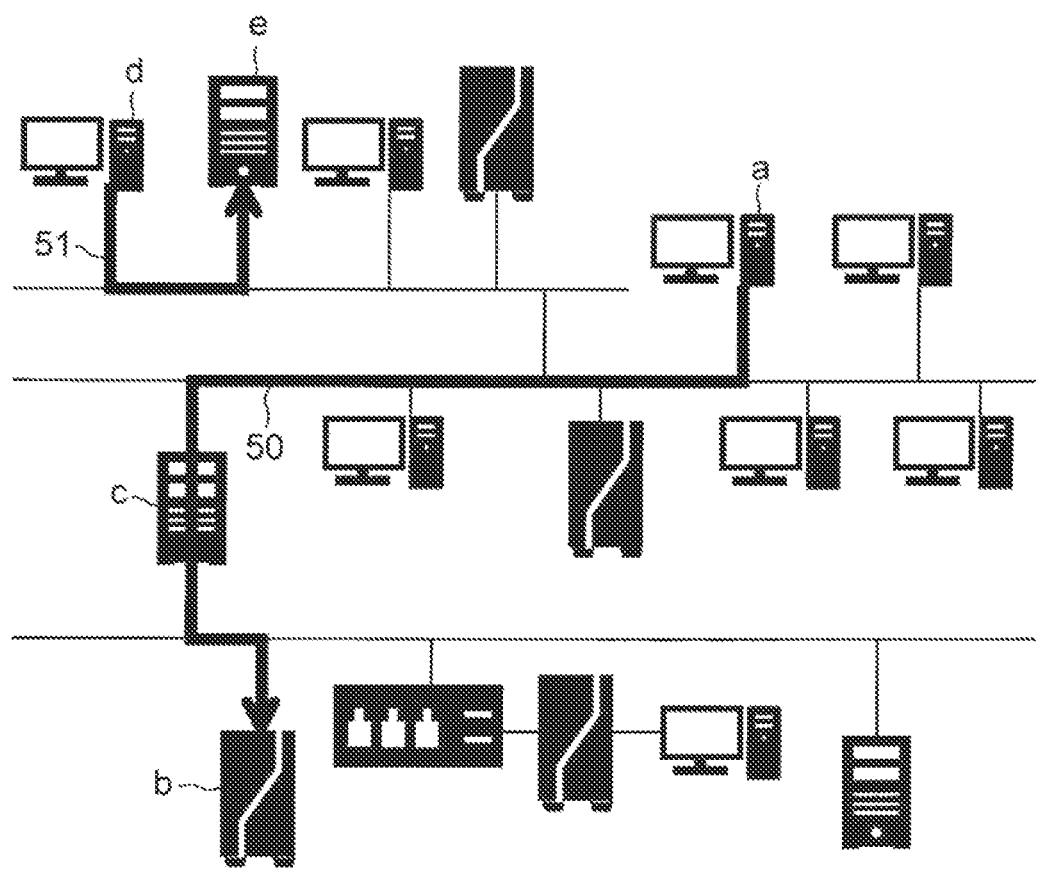
FIG. 6 It is a schematic diagram depicting a display example of the first attack route in the first example embodiment.

The display control unit 6 displays the attack routes on the display device 7 by superimposing them on the network topology identified by the topology identification unit 4. FIG. 6 is a schematic diagram depicting a display example of the first attack route in the first example embodiment.

In the example shown in FIG. 6, the display control unit 6 displays the attack route "device a→device c→device b" (hereinafter referred to as attack route 50, denoted by the sign "50"). The display control unit 6 also displays the attack route "device d→device e" (hereinafter referred to as attack route 51, denoted by the code "51").

The display device 7 is a device that displays information, and can be a general display device. If the analysis system 1 exists in the cloud, the display device 7 may be a display device of a terminal connected to the cloud.

Figure 7:
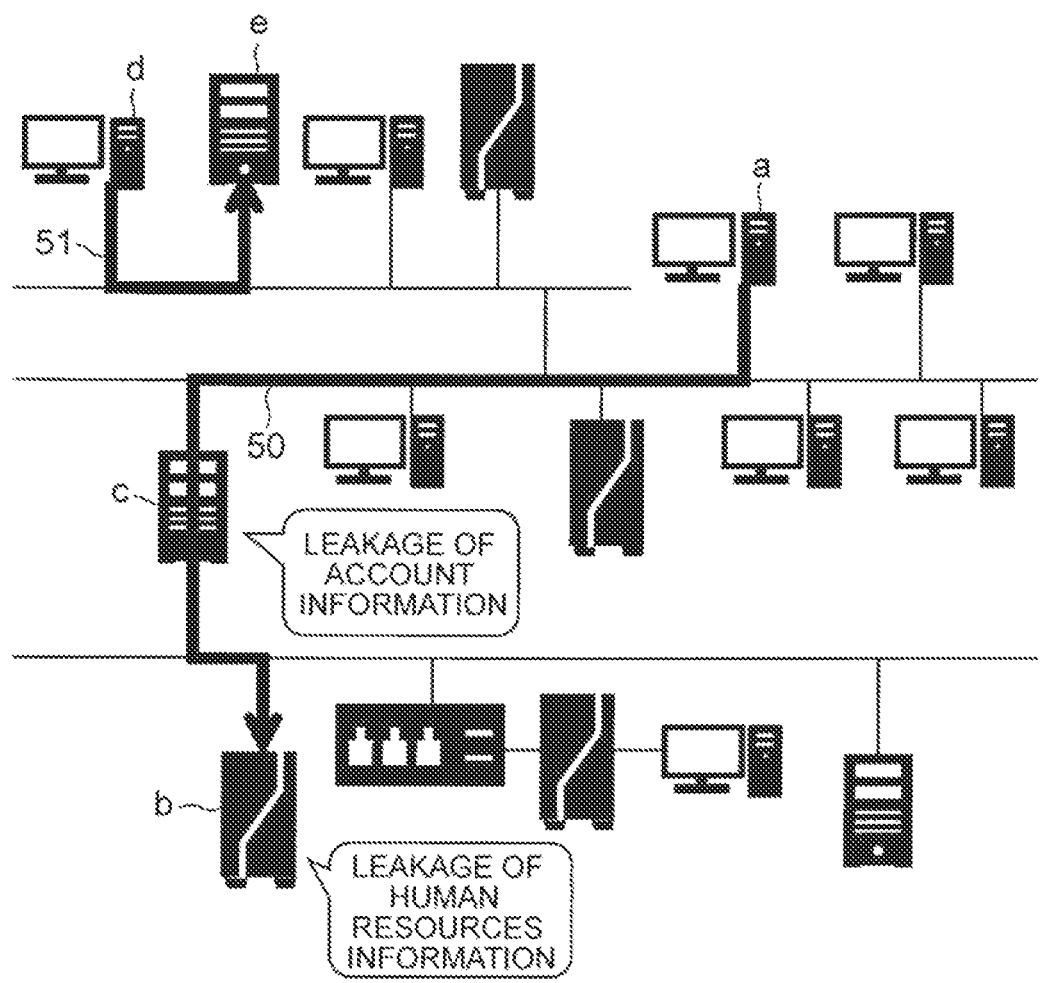
FIG. 7 It is a schematic diagram depicting another display example of the first attack route in the first example embodiment.

In addition to displaying each attack route, the display control unit 6 may also display damage information (i.e., information that indicates content of damage of devices when the devices are attacked) in the vicinity of the device for which the damage information has been identified. FIG. 7 is a schematic diagram depicting another display example of the first attack route in the first example embodiment.

In the example shown in FIG. 7, damage information is identified for the devices c, b on the aforementioned attack route 50, respectively, and the display control unit 6 displays the corresponding damage information in the vicinity of the devices c and b, respectively, on the display device 7. Here, the display control unit 6 may display each attack route as well as information on security such as the vulnerability of the device in the vicinity of the device.

The display control unit 6 may change the size and color of the text and pop-ups according to the magnitude of the content of damage indicated by the damage information. For example, the content of the damage information may be ranked in advance, and the display control unit 6 may set the size and color of the text and pop-ups according to the rank when displaying the damage information.

The display format of damage information is not limited to the above example. For example, the display control unit 6 may display an icon near the device for which damage information has been identified, indicating that damage information is related to that device. When the icon is clicked by a mouse and the like, the display control unit 6 may display the damage information about the device. Alternatively, the display control unit 6 may display damage information about the device when the icon is in mouse-over state (rollover). The display control unit 6 may also display damage information in a pop-up window and change the size of the pop-up window according to the operation by the mouse and the like.

Based on the damage information in the arbitrary device identified by the damage identification unit 8, the detection unit 5 further detects the attack route when the arbitrary device is attacked. Hereafter, the attack route that indicates the flow of the attack that can be executed due to the content of damage may be referred to as the second attack route. The detection unit 5 of this example embodiment predicts the content of damage more specifically according to the role of the device under attack.

For example, the device c, whose function is identified as "account server function" in the above example, may be an ID management server. If the ID management server is attacked, the pair of the managed personal information and authentication information (e.g., the pair of ID and password) will be leaked.

If the ID and password are stolen, an attack requiring authentication information could be established. Specifically, if the ID and password are stolen, an attack on or from a device that requires the ID and password managed by the device c for login could theoretically be established. However, this is not the case if the authority of the stolen ID is general authority rather than administrative authority.

For example, if the data collection unit 2 collects information about the data flow between each device, the detection unit 5 can estimate the devices that have registered IDs and passwords for login in the device c.

Next, the detection unit 5 detects the second attack route based on the identified damage information. Specifically, if the ID and password managed by the device c are stolen, the detection unit 5 identifies the second attack route, which is an attack route that indicates the flow of the attack that can be executed using the stolen ID and password.

When identifying the second attack route, the detection unit 5 may also use the information about the collected data flow. The second attack route may be given to the detection unit 5 in advance by an administrator. The first attack route and the second attack route are basically different attack routes, but they may be the same attack route.

Figure 8:
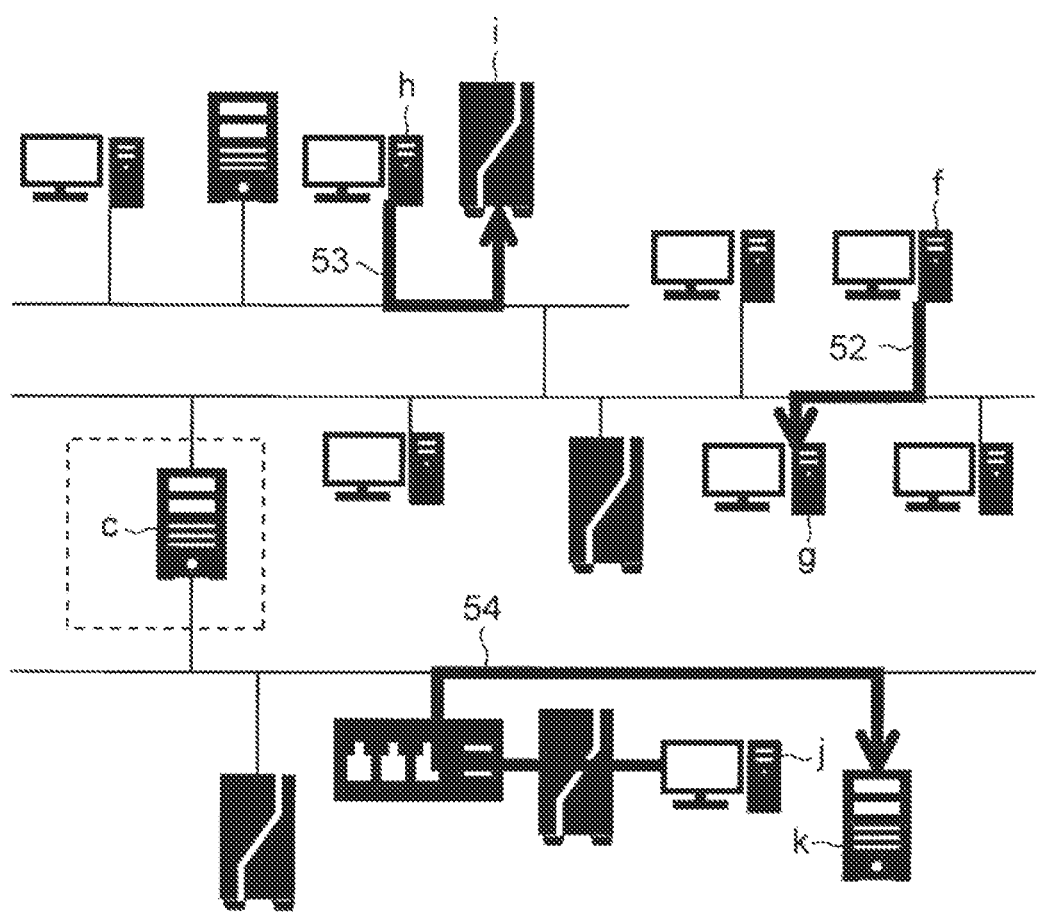
FIG. 8 It is a schematic diagram depicting a display example of the second attack route in the first example embodiment.

FIG. 8 is a schematic diagram depicting a display example of the second attack route in the first example embodiment. The display example shown in FIG. 8 is an example of the display control unit 6 receiving instructions from the administrator to display the attack route on the display device 7 when the device c is attacked.

The display control unit 6 receives, for example, the designation of each device on the first attack route from the administrator via a Graphical User Interface (not shown).

In the example shown in FIG. 8, the display control unit 6 displays the attack route "device f→device g" (hereinafter referred to as attack route 52, denoted by the sign "52"), the attack route "device h→device i" (hereinafter referred to as attack route 53, denoted by the sign "53"), and the attack route "device j→device k" (hereinafter referred to as attack route 54, denoted by the sign "54"), respectively. In other words, in this example, since the device c managed the ID and password required to login to the device f, the device h, and the device j respectively, the detection unit 5 identified the attack routes 52, 53, and 54 shown in FIG. 8.

When an important device on the attack route (the first attack route) is specified, the display control unit 6 may display the specified server with emphasis. As shown in FIG. 8, the device c which is an important device, is highlighted and displayed with a dashed rectangle.

The display control unit 6 may display the first and second attack routes together, or only the second attack route. The display control unit 6, for example, displays the first and second attack routes separately on each of the two screens displayed by the display device 7, as shown in FIG. 9. FIG. 9 is a schematic diagram depicting a display example of the first and second attack routes in the first example embodiment.

Figure 10:
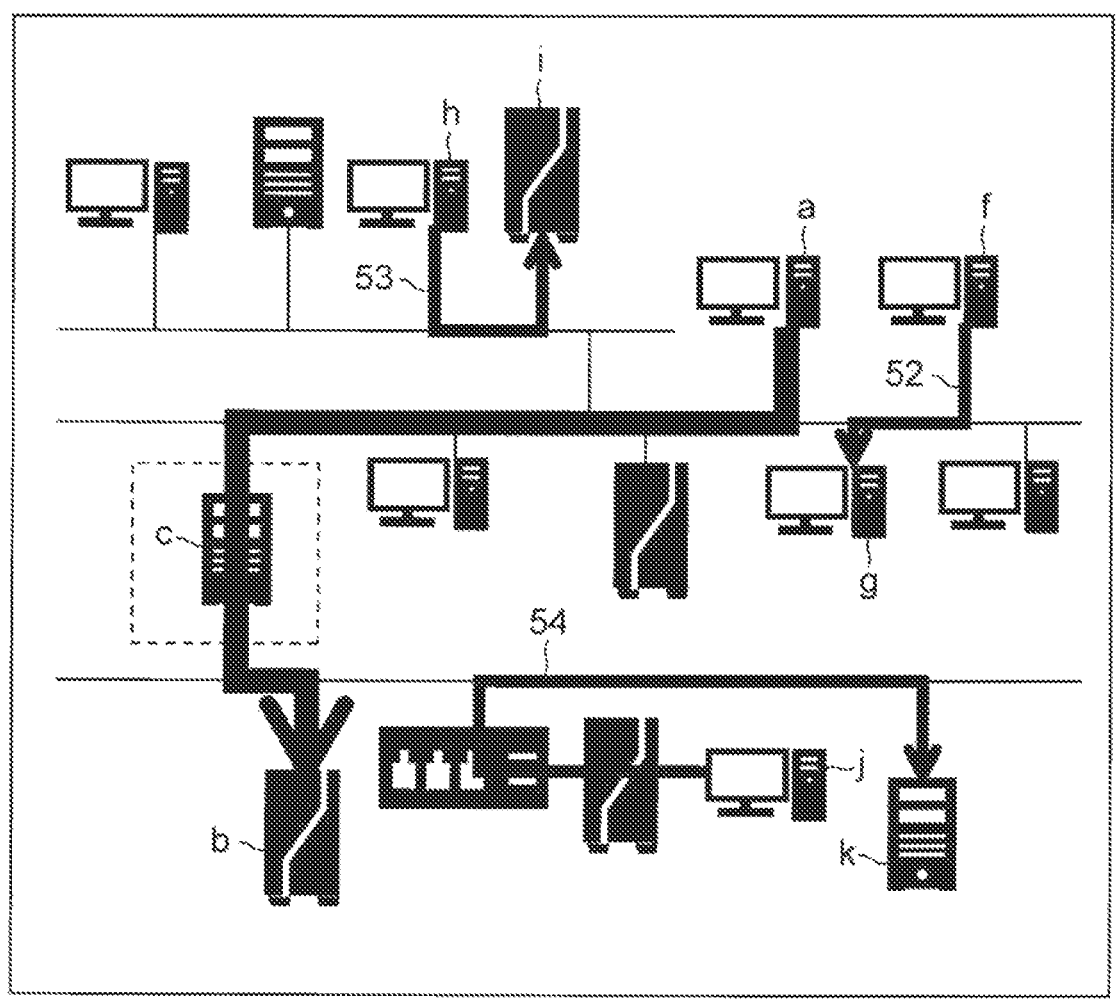
FIG. 10 It is a schematic diagram depicting another display example of the first and second attack routes in the first example embodiment.

When displaying them together, the display control unit 6 displays the first and second attack routes together on one screen displayed by the display device 7, as shown in FIG. 10, for example. FIG. 10 is a schematic diagram depicting another display example of the first and second attack routes in the first example embodiment.

The display control unit 6 distinguishes and displays the first attack route from the second attack route by changing the thickness and color or other methods. In the example shown in FIG. 10, the first attack route is displayed thicker than the second attack route. The display control unit 6 may also switch the display method of the first and second attack routes according to instructions from the administrator.

The display control unit 6 may also display the first attack route, which is associated with the detection of more second attack routes, with particular emphasis on the first attack route. When displayed with emphasis, the administrator can recognize that if the attack indicated by the highlighted first attack route can be prevented, there is a possibility that the attack indicated by the more second attack routes can also be prevented.

The display control unit 6 may display the first attack route, for which there is no corresponding second attack route, without emphasis it. The reason for this is that the possibility of damage spreading based on the first attack route for which there is no corresponding second attack route is lower than for other first attack routes.

For both the first and second attack routes, the display control unit 6 may change the display method according to the magnitude of the damage. If the display method is changed in this way, the administrator can identify the attack route that has the greatest impact on the system.

Figure 11:
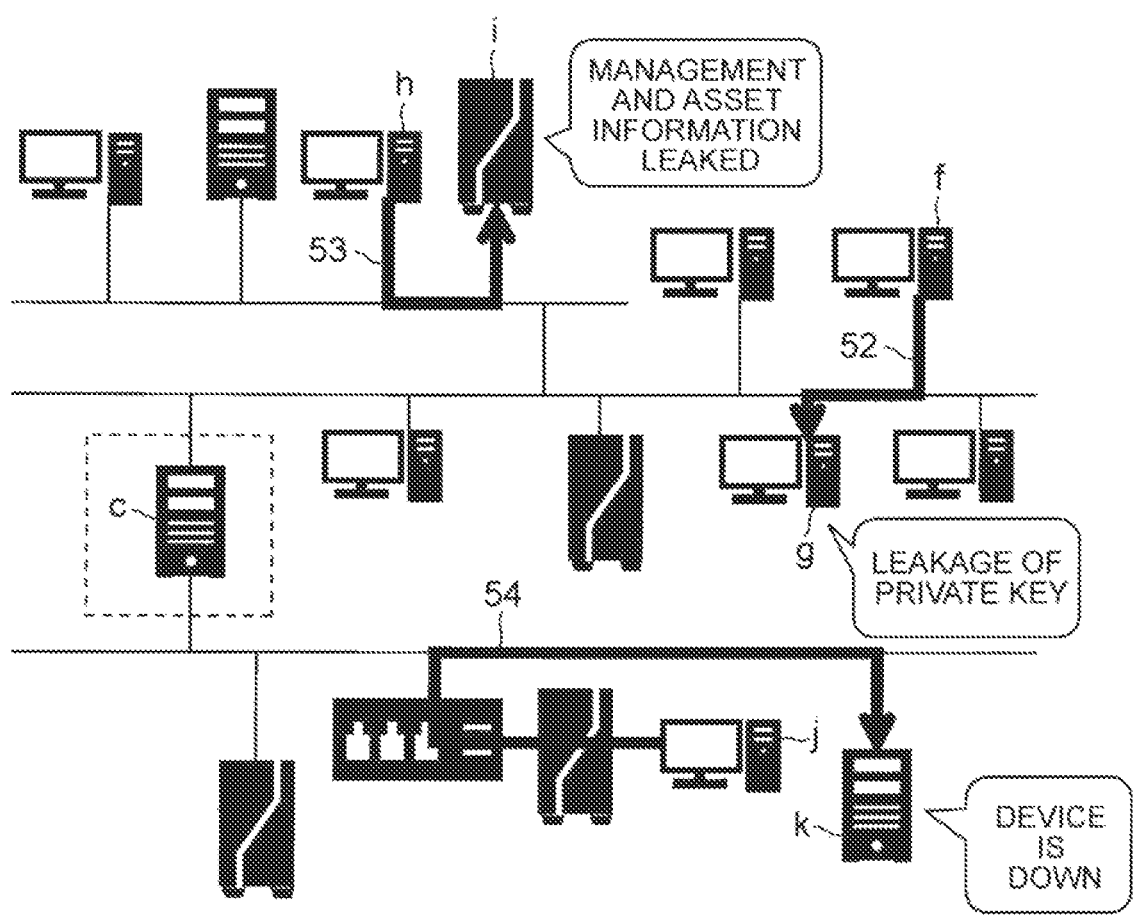
FIG. 11 It is a schematic diagram depicting another display example of the second attack route in the first example embodiment.

The damage identification unit 8 may also identify damage information for each device on the attack route (the second attack route) newly identified by the detection unit 5. Furthermore, the display control unit 6 may display each attack route and also display the damage information in the vicinity of the device for which the damage information has been identified. FIG. 11 is a schematic diagram depicting another display example of the second attack route in the first example embodiment.

In the example shown in FIG. 11, damage information is identified for the device g on the aforementioned attack route 52, the device i on the attack route 53, and the device k on the attack route 54, respectively, and the display control unit 6 displays the corresponding damage information in the vicinity of the devices g, i, and k, respectively, displayed on the display device 7.

As shown in FIG. 11, in the vicinity of the device g, the message "Leakage of private key" is displayed. In the vicinity of the device i, the message "Management and asset information leaked" is displayed. In the vicinity of the device k, the message "Device is down" is displayed.

In some cases, when personal information such as name and date of birth is stolen, it may be possible to infer the ID and password from the stolen personal information. In other words, the detection unit 5 may be able to identify the attack route (the second attack route) shown in FIG. 8 even when a server that manages arbitrary personal information is specified instead of an ID management server. Specifically, the detection unit 5 identifies the second attack route, which is an attack route that indicates the flow of the attack that can be executed using the ID and password inferred from the stolen personal information.

In addition, if information about the system's administrative privileges is stolen, the types of data managed by the devices in the system that can be stolen will increase dramatically. In addition, any attack against the devices in the system can be established, including installation of malware, downing of the devices, and stopping of the services provided by the devices.

The reason for this is that the security breached by the use of information about administrative privileges is greater than the security breached by the use of information about general privileges. Therefore, when information about administrative privileges is stolen, the detection unit 5 identifies more attack routes (the second attack routes).

The data collection unit 2 is realized, for example, by a CPU (Central Processing Unit) of a computer that operates according to an analysis program and a communication interface of the computer. For example, the CPU may read the analysis program from a program recording medium such as a program storage device of the computer, and operate as the data collection unit 2 according to the program and using the communication interface of the computer. The topology identification unit 4, the detection unit 5, the display control unit 6, and the damage identification unit 8 are realized, for example, by the CPU of the computer operating according to the analysis program. For example, the CPU may read an analysis program from a program recording medium as described above, and operate as the topology identification unit 4, the detection unit 5, the display control unit 6, and the damage identification unit 8 according to the program. The data storage unit 3, the risk information storage unit 9, and the damage information storage unit 10 is realized, for example, by a storage device included in the computer.

Figure 12:
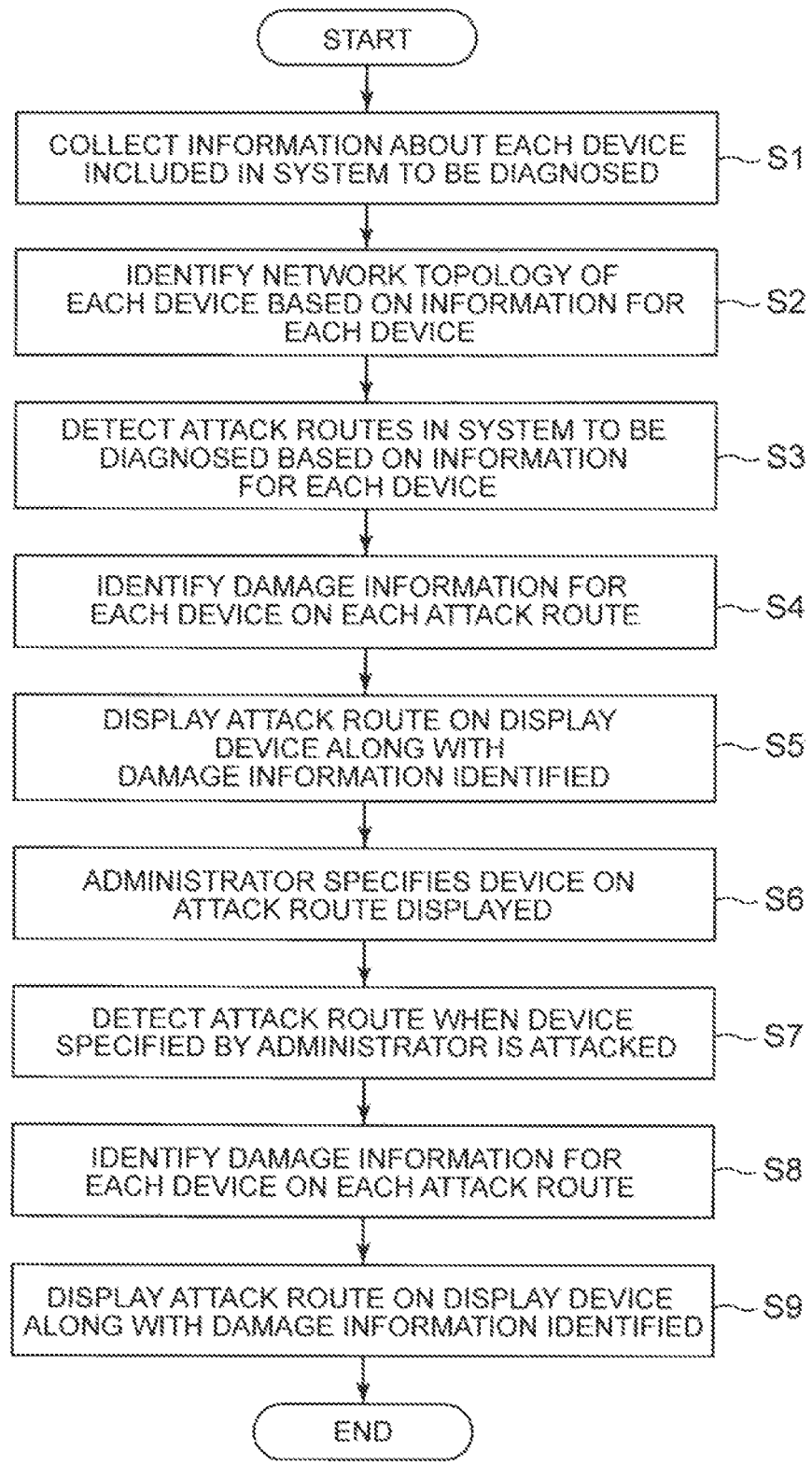
FIG. 12 It is a flowchart depicting an example of the processing process of the analysis system of the first example embodiment.

Next, the processing process will be explained. FIG. 12 is a flowchart depicting an example of the processing process of the analysis system 1 of the first example embodiment. The matters already explained are omitted.

First, the data collection unit 2 collects information about each device included in the system to be diagnosed (Step S1). The data collection unit 2 stores the collected information in the data storage unit 3.

Next, the topology identification unit 4 identifies the network topology of each device (Step S2).

Next, the detection unit 5 detects the attack routes (the first attack routes) in the system to be diagnosed based on the security information for each device (Step S3).

Next, the damage identification unit 8 identifies the damage information for each device on each attack route detected in Step S3 (Step S4).

Next, the display control unit 6 superimposes on the network topology and displays the attack route detected in Step S3 on the display device 7 along with the damage information identified in Step S4 (Step S5).

Next, the administrator inputs the information indicating the device to be designated to the display control unit 6. The administrator specifies the target device, for example, by clicking on the device on the attack route displayed in Step S5 with the mouse or other means (Step S6).

Next, the display control unit 6 inputs the input information to the detection unit 5. Next, the detection unit 5 detects the attack route (the second attack route) when the device specified by the administrator is attacked (Step S7).

Next, the damage identification unit 8 identifies the damage information for each device on each attack route detected in Step S7 (Step S8). The process in Step S8 may be omitted.

Next, the display control unit 6 displays the attack route detected in Step S7, superimposed on the network topology, on the display device 7 along with the damage information identified in Step S8 (Step S9). If the process of Step S8 is omitted, the display control unit 6 may not display the damage information on the display device 7.

At the end of the process of Step S9, the administrator may give a new instruction to the analysis system 1 to display the attack route (the second attack route) when other devices are attacked. If a new instruction is input, each of the processes from Step S7 to Step S9 is repeatedly executed.

The detection unit 5 of this example embodiment can further detect the attack route when any device is attacked, as described above. In other words, the analysis system 1 of this example embodiment can more concretely predict the content of damage of the attacked device when the device on a given attack route is attacked.

Therefore, when the analysis system 1 of this example embodiment is used, it becomes clear what data will be stolen or how much the system will be affected when the attach has occurred. In other words, when the analysis system 1 of this example embodiment is used, security administrators can easily understand the damage that may occur when devices on the attack route are attacked.

Figure 13:
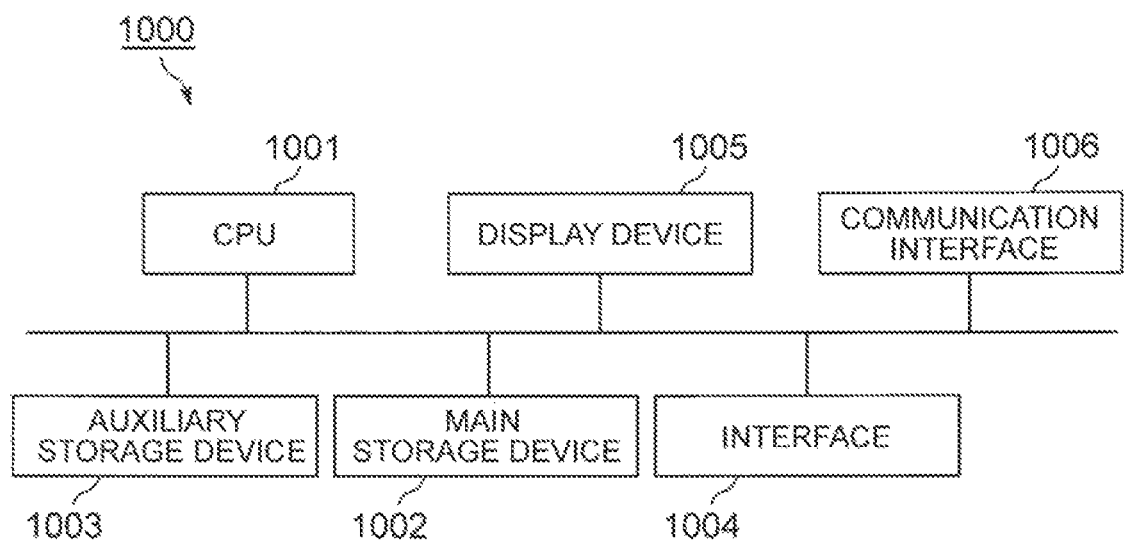
FIG. 13 It is a schematic block diagram of a computer configuration for the analysis system of example embodiment of the present invention.

FIG. 13 is a schematic block diagram of a computer configuration for the analysis system 1 of example embodiment of the present invention. The computer 1000 includes a CPU 1001, a main storage device 1002, an auxiliary storage device 1003, an interface 1004, a display device 1005, and a communication interface 1006.

The analysis system 1 of example embodiment of the present invention is realized by a computer 1000. The operation of the analysis system 1 is stored in the auxiliary storage device 1003 in the form of an analysis program. The CPU 1001 reads the analysis program from the auxiliary storage device 1003, expands it to the main storage device 1002, and executes the processing described in the above example embodiment according to the analysis program.

The auxiliary storage device 1003 is an example of a non-transitory tangible medium. Other examples of non-transitory tangible media include a magnetic disk, a magneto-optical disk, CD-ROM (Compact Disk Read Only Memory), DVD-ROM (Digital Versatile Disk Read Only Memory), semiconductor memory, and the like, which are connected via an interface 1004. When the program is delivered to the computer 1000 via a communication line, the computer 1000 receiving the delivery may expand the program into the main memory device 1002 and execute the processing described in the above example embodiment according to the program.

Some or all of the components may be realized by general-purpose or dedicated circuitry, processors, or a combination of these. They may be configured with a single chip, or configured with the plurality of chips connected via a bus. Some or all of each component may be realized by a combination of the above-mentioned circuitry, etc. and programs.

When some or all of each component is realized by the plurality of information processing devices, circuitry, etc., the plurality of information processing devices, circuitry, etc. may be centrally located or distributed. For example, the information processing devices, circuitry, etc. may be implemented as a client-and-server system, cloud computing system, etc., each of which is connected via a communication network.

Figure 14:
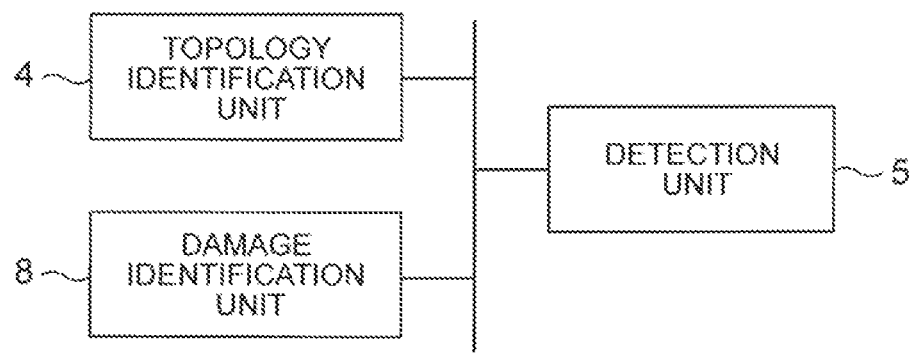
FIG. 14 It is a block diagram depicting an overview of an analysis system according to the present invention.

Next, an overview of the present invention will be described. FIG. 14 is a block diagram depicting an overview of an analysis system according to the present invention. The analysis system of the present invention includes a topology identification unit 4, a detection unit 5, and a damage identification unit 8.

The topology identification unit 4 identifies a network topology of devices included in the system to be diagnosed.

The detection unit 5 detects first attack routes that indicate flows of attacks that can be executed in the system to be diagnosed, based on security information about each device.

The damage identification unit 8 identifies damage information that indicates content of damage of devices on the first attack routes when the devices are attacked. The detection unit 5 detects, based on the security information and the identified damage information, second attack routes that indicate flows of attacks that can be executed resulting from the content of damage.

With such a configuration, it is possible to analyze the damage that may occur when a device on an attack route is attacked.

The above example embodiments of the present invention can be described as, but not limited to, the following supplementary notes.

(Supplementary Note 1)

An analysis system comprising:
a topology identification unit that identifies a network topology of devices included in the system to be diagnosed;
a detection unit that detects first attack routes that indicate flows of attacks that can be executed in the system to be diagnosed, based on security information about each device; and,
a damage identification unit that identifies damage information that indicates content of damage of devices on the first attack routes when the devices are attacked,
wherein the detection unit detects, based on the security information and the identified damage information, second attack routes that indicate flows of attacks that can be executed resulting from the content of damage.

(Supplementary Note 2)

The analysis system according to supplementary note 1, further comprising:
a display control unit that displays the first attack routes and the second attack routes on a display device by superimposing the first attack routes and the second attack routes on the network topology.

(Supplementary Note 3)

The analysis system according to supplementary note 2, wherein the display control unit displays the first attack routes and the second attack routes together on a single screen displayed by the display device.

(Supplementary Note 4)

The analysis system according to supplementary note 2, wherein the display control unit displays the first attack routes and the second attack routes separately on each of two screens displayed by the display device.

(Supplementary Note 5)

The analysis system according to any one of supplementary notes 2 to 4,
wherein the display control unit displays the damage information near the devices on the first attack routes.

(Supplementary note 6)

The analysis system according to any one of supplementary notes 2 to 5,
wherein the damage identification unit identifies the damage information that indicates the content of damage of devices on the second attack routes when the devices are attacked.

(Supplementary Note 7)

The analysis system according to supplementary note 6,
wherein the display control unit displays the damage information near the devices on the second attack routes.

(Supplementary Note 8)

The analysis system according to any one of supplementary notes 1 to 7,
wherein the detection unit detects the second attack routes related to the attack resulting from the content of damage of the devices on the first attack routes specified from the outside when the devices are attacked.

(Supplementary Note 9)

An analysis method, implemented by a computer, comprising:
identifying a network topology of devices included in the system to be diagnosed;
detecting first attack routes that indicate flows of attacks that can be executed in the system to be diagnosed, based on security information about each device;
identifying damage information that indicates content of damage of devices on the first attack routes when the devices are attacked; and,
detecting, based on the security information and the identified damage information, second attack routes that indicate flows of attacks that can be executed resulting from the content of damage.

(Supplementary Note 10)

A computer-readable recording medium in which an analysis program is recorded, the analysis program causing a computer to execute:
a topology identification process of identifying a network topology of devices included in the system to be diagnosed;
a first detection process of detecting first attack routes that indicate flows of attacks that can be executed in the system to be diagnosed, based on security information about each device;

a damage identification process of identifying damage information that indicates content of damage of devices on the first attack routes when the devices are attacked; and, a second detection process of detecting, based on the security information and the identified damage information, second attack routes that indicate flows of attacks that can be executed resulting from the content of damage.

Although the invention of the present application has been described above with reference to example embodiments and examples, the present invention is not limited to the above example embodiments and examples. Various changes can be made to the configuration and details of the present invention that can be understood by those skilled in the art within the scope of the present invention.

This application is based upon and claims the benefit of priority from Japanese patent application No. 2019-063599 filed on Mar. 28, 2019, the disclosure of which is incorporated herein in its entirety by reference.

INDUSTRIAL APPLICABILITY

This invention is suitably applied to analysis systems that display attack routes.

REFERENCE SIGNS LIST

1 Analysis system
2 Data collection unit
3 Data storage unit
4 Topology identification unit
5 Detection unit
6 Display control unit
7 Display device
8 Damage identification unit
9 Risk information storage unit
10 Damage information storage unit

What is claimed is:

1. An analysis system comprising:
at least one memory configured to store instructions; and
at least one processor connected to the at least one memory and configured to execute the instructions to:
identify a network topology of devices included in a system to be diagnosed;
detect first attack routes that indicate first flows of attacks that can be executed in the system to be diagnosed, based on security information about each of the devices,
identify first damage information that indicates content of first damage of first devices on the first attack routes when the devices are attacked; and
detect, based on the security information and the first damage information, second attack routes that indicate second flows of the attacks that can be executed resulting from the content of the first damage.

2. The analysis system according to claim 1, wherein the at least one processor is further configured to execute the instructions to:
display the first attack routes and the second attack routes on a display device by superimposing the first attack routes and the second attack routes on the network topology.

3. The analysis system according to claim 2, wherein the at least one processor is further configured to execute the instructions to:
display the first attack routes and the second attack routes together on a single screen displayed by the display device.

4. The analysis system according to claim 2, wherein the at least one processor is further configured to execute the instructions to:
display the first attack routes and the second attack routes separately on each of two screens displayed by the display device.

5. The analysis system according to claim 2, wherein the at least one processor is further configured to execute the instructions to:
display the first damage information near the first devices.

6. The analysis system according to claim 2, wherein the at least one processor is further configured to execute the instructions to:
identify second damage information that indicates content of second damage of second devices when the second devices are attacked, the second devices being the devices on the second attack routes.

7. The analysis system according to claim 6, wherein the at least one processor is further configured to execute the instructions to:
display the second damage information near the second devices.

8. The analysis system according to claim 1, wherein the at least one processor is further configured to execute the instructions to:
obtain specified devices that are specified from outside from among the first devices; and
detect the second attack routes from the content of the first damage of the specified devices.

9. An analysis method, implemented by a computer, comprising:
identifying a network topology of devices included in a system to be diagnosed;
detecting first attack routes that indicate first flows of attacks that can be executed in the system to be diagnosed, based on security information about each of the devices;
identifying first damage information that indicates content of first damage of first devices on the first attack routes when the devices are attacked; and
detecting, based on the security information and the first damage information, second attack routes that indicate second flows of the attacks that can be executed resulting from the content of the first damage.

10. A computer-readable recording medium in which an analysis program is recorded, the analysis program causing a computer to execute:
a topology identification process of identifying a network topology of devices included in a system to be diagnosed;
a first detection process of detecting first attack routes that indicate first flows of attacks that can be executed in the system to be diagnosed, based on security information about each of the devices;
a damage identification process of identifying first damage information that indicates content of first damage of first devices on the first attack routes when the devices are attacked; and
a second detection process of detecting, based on the security information and the first damage information, second attack routes that indicate second flows of the attacks that can be executed resulting from the content of the first damage.

11. The analysis system according to claim 3, wherein the at least one processor is further configured to execute the instructions to:
    display the first damage information near the first devices.

12. The analysis system according to claim 4, wherein the at least one processor is further configured to execute the instructions to:
    display the first damage information near the first devices.

13. The analysis system according to claim 3, wherein the at least one processor is further configured to execute the instructions to:
    identify second damage information that indicates content of second damage of second devices on the second attack routes when the devices are attacked.

14. The analysis system according to claim 4, wherein the at least one processor is further configured to execute the instructions to:
    identify second damage information that indicates content of second damage of second devices on the second attack routes when the devices are attacked.

15. The analysis system according to claim 5, the at least one processor is further configured to execute the instructions to:
    identify second damage information that indicates content of second damage of second devices on the second attack routes when the devices are attacked.

16. The analysis system according to claim 11, wherein the at least one processor is further configured to execute the instructions to:
    identify second damage information that indicates content of second damage of second devices on the second attack routes when the devices are attacked.

17. The analysis system according to claim 12, wherein the at least one processor is further configured to execute the instructions to:
    identify second damage information that indicates content of second damage of second devices on the second attack routes when the devices are attacked.

18. The analysis system according to claim 13, wherein the at least one processor is further configured to execute the instructions to:
    display the second damage information near the second devices.

19. The analysis system according to claim 14, wherein the at least one processor is further configured to execute the instructions to:
    display the second damage information near the second devices.

20. The analysis system according to claim 15, wherein the at least one processor is further configured to execute the instructions to:
    display the second damage information near the second devices.

* * * * *